United States Patent [19]

Greiner et al.

[11] Patent Number: 4,608,277

[45] Date of Patent: Aug. 26, 1986

[54] ENCAPSULATED SALTS OF SPARING SOLUBILITY IN WATER, THEIR PREPARATION AND THEIR USE

[75] Inventors: Ulrich Greiner, Schöneck; Karl-Heinz Keil, Hanau-Mittelbuchen; Rüdolf Heinrich; Konrad Albrecht, both of Kelkheim, all of Fed. Rep. of Germany

[73] Assignee: Casella Aktiengesellschaft, Frankfort am Main, Fed. Rep. of Germany

[21] Appl. No.: 761,909

[22] Filed: Aug. 2, 1985

Related U.S. Application Data

[62] Division of Ser. No. 648,123, Sep. 6, 1984, Pat. No. 4,547,429.

[30] Foreign Application Priority Data

Sep. 17, 1983 [DE] Fed. Rep. of Germany ....... 3333654

[51] Int. Cl.$^4$ .............................................. B01J 13/02
[52] U.S. Cl. .................................. 427/213.3; 156/663; 252/315.2; 252/315.4; 427/213.31; 427/213.32; 427/213.34; 428/402.24; 428/407
[58] Field of Search ........................... 428/402.24, 407; 252/315.2, 315.4; 156/663; 648/123; 427/213.3, 213.31, 213.32, 213.34

[56] References Cited

U.S. PATENT DOCUMENTS 4,070,346 1/1978 Schnoring et al. ................... 528/68
4,379,071 4/1983 Schnoring et al. ................ 252/316

Primary Examiner—Maurice J. Welsh
Attorney, Agent, or Firm—Connolly and Hutz

[57] ABSTRACT

Encapsulated salts of organic or inorganic acid particles having sparing solubility in water wherein the salt particles are surrounded by a pressure-resistant, elastic, abrasion-resistant polyurethane/polyurea casing, the ratio by weight of salt to the polyurethane component of the casing material being 1:0.2 to 1:2.5, are produced by emulsifying a mixture of 83 to 28% by weight of the salt to be encapsulated and 17 to 72% by weight of a polyurethane prepolymer containing free isocyanate groups in water in the presence of a protective colloid and reacting the emulsified prepolymer with the equivalent amount of polyamine at temperatures from 0° to 80° C., with vigorous mixing.

8 Claims, No Drawings

ENCAPSULATED SALTS OF SPARING SOLUBILITY IN WATER, THEIR PREPARATION AND THEIR USE

This is a division of application Ser. No. 648,123, filed on Sept. 6, 1984, now U.S. Pat. No. 4,547,429.

The present invention relates to salts, of organic or inorganic acids, which are sparingly soluble in water and which are surrounded by a pressure-resistant, elastic and abrasion-resistant polyurethane/polyurea casing.

In recent years the technology of microencapsulation has become increasingly important, since it makes possible this method of enclosing reactive or corrosive substances in various states of aggregation in an unreactive, inert capsule. Numerous mechanical and chemical processes for the production of capsules have already been described and used (cf. in this regard: I. E. Vandegaer, "Microencapsulation"; Plenum Pres, New York—London; 1974). Meanwhile, microcapsules have been employed as carriers for many kinds of different substances, such as, for example, inks and dyestuffs, perfumes or flavourings, pharmaceutical formulations, chemical reagents, plant protection agents and the like.

An example which is particularly important is the encapsulation of toxic substances from the aspect of safety in handling. A further advantage of encapsulating active compounds is the possibility of combining with one another active compounds which are not miscible or are incompatible with one another. Encapsulation of active compounds in order to reduce odour nuisance in the case of active compounds having an intense odour can also be advantageous. A further important advantage of encapsulation is that it is thereby possible to achieve release of the active compound in a manner controlled by time and quantities (depot action). This slow release effect makes it possible for the active compound to be utilised in an improved manner, the number of applications necessary to be limited and hence to reduce the total quantity of active compound to be applied.

It is already known to prepare polyureas or polyurethanes from diisocyanates or polyisocyanates or prepolymers thereof, using diamines or polyamines as chain-lengthening components, and to use this reaction for the production of microcapsules.

The preparation of oil-containing capsules from a low-molecular hydrophobic phase containing isocyanate groups and from a hydrophilic phase containing water, diols or amines is known from German Auslegeschrift No. 1,519,853 (corresponding to U.S. Pat. No. 3,864,275. The capsules thus formed have a very low wall thickness and are therefore not sufficiently mechanically stable for practical use. The process described therein itself also contains considerable disadvantages. Since the production of the capsules depends on the principle of coacervate-formation, it is absolutely necessary, in order to carry out the process satisfactorily, to maintain the parameters of pH, temperature and viscosity accurately within narrow limits of tolerance. Additionally, use of low-molecular, reactive, polyfunctional compounds, such as polyisocyanates and chlorides of polybasic carboxylic acids, which is necessary in this process, is very disadvantageous. In the event of the process being carried out inexpertly, carboxylic acid chlorides can evolve hydrochloric acid, which can cause undesirable reactions with the contents of the capsules. Polyisocyanates must be handled very carefully because of their extremely high reactivity, in particular with the solvent water.

An additional reinforcement of the capsule walls by multi-layer build-up is therefore described in German Auslegeschrift No. 1,817,316 (corresponding to British Pat. No. 1,257,178). This process, which takes place in several stages, is tedious and also results in capsule walls which, after damage, liberate the enclosed active substance immediately and completely.

German Auslegeschrift No. 2,043,556 (corresponding to U.S. Pat. No. 3,726,804) describes a process for the production of microcapsules in which the film-forming materials present in oil droplets migrate to the surface of these oil droplets and there result in the build-up of the wall material. Like those obtained in accordance with German Offenlegungsschrft No. 2,109,335, these capsules also have little mechanical stability and are relatively sensitive to pressure.

German Offenlegungsschrift No. 2,242,910 (corresponding to U.S. Pat. Nos. 3,886,085 and 4,021,595) and German Offenlegungsschrift No. 2,251,381 (corresponding to U.S. Pat. No. 3,900,669) have described pressure-sensitive microcapsules for duplicating paper which are prepared by reacting polyamines with isocyanate prepolymers.

In accordance with German Offenlegungsschrift No. 2,311,712 (corresponding to U.S. Pat. No. 4,379,071) a capsule material is produced by reacting diols or polyols with phosgene or by reacting a diisocyanate or polyisocyanate with polyamines, polyesters, polyethers, polyacetals or polyols. These capsules are relatively sensitive to pressure and have very thin walls. Similarly, a process for the production of polyurea capsules having extremely thin walls is described in German Offenlegungsschrift No. 2,312,059.

A continuously operating process for the production of a polyurethane/polyurea powder by interface polyaddition is described in German Offenlegungsschrift No. 2,404,538 (corresponding to U.S. Pat. No. 4,070,346). These particles, which can also contain other substances occluded, are obtained by atomising a polyisocyanate or a prepolymer into a phase consisting of gaseous diamine or polyamine. The interface polyaddition to give the polyurethane/polyurea takes place here in the phase in which the atomised isocyanate or isocyanate prepolymer is in flight. A further process is also known (German Offenlegungsschrift No. 2,557,407), in which hollow beads of polyurethane/polyurea can be produced from a polyisocyanate or an isocyanate prepolymer by polyaddition with a diamine or polyamine in the gas phase, the skin of the beads in a special process variant consisting externally of polyurea and internally of polyurethane.

German Offenlegungsschrift No. 2,757,017 (corresponding to U.S. Pat. No. 4,230,809) relates to encapsulated plant protection agents which are obtained by dissolving the plant protection agents together with polyisocyanate prepolymers in an organic, water-immiscible phase, then emulsifying the organic phase in an aqueous solution of a protective colloid and stirring the emulsion for a certain time. In this process, excess free isocyanate groups of the polyisocyanate prepolymer react with the water with the formation of urea bridges. Pressure-resistant polyurethane/polyurea particles which have a structured internal composition and which contain the plant protection active compounds are obtained in this way.

The present invention relates to the encapsulation of salts, of sparing solubility in water, of organic or, preferably, inorganic acids. There is frequently a need to remove salts which are sparingly soluble in water from interaction with their immediate surroundings, in order to be able to handle them in a simpler manner or with greater safety or to make them available for special end uses. Thus it is possible, for example, to conceive of protecting sparingly soluble salts of hydrocyanic acid from reacting with the carbon dioxide of the atmosphere, or of fixing toxic salts in particles of a specific size in order to prevent the formation of dust and thus the contamination of the environment or in order to carry out chemical reactions with such salts at specific places which, under certain circumstances, are inaccessible. In many of these cases there is an additional requirement that, although the protective casing should protect the salts against unintentional interaction with the environment, in the event of use it must also permit the access of reagents to the insoluble salts. The protective casings must thus have a certain permeability. The casings of the salts of sparing solubility in water should, however, on the other hand have the maximum mechanical stability, so that they are not mechanically damaged or abraded by pressure, shearing forces or pouring processes.

It has now been found that encapsulated salts, of organic or inorganic acids, which are sparingly soluble n water and in which the salt particles are surrounded by a pressure-resistant, elastic, abrasion-resistant polyurethane/polyurea casing have the desired technical properties in use. In the salts, of organic or inorganic acids, which are sparingly soluble in water and which have been encapsulated in accordance with the invention, the ratio by weight of salt to the polyurethane component of the casing material is between 1 to 0.2 and 1 to 2.5, preferably between 1 to 0.3 and 1 to 0.8.

The polyurethane/polyurea casing of the sparingly soluble salts which have been encapsulated in accordance with the invention is characterised in that it has been synthesised by reacting a polyurethane prepolymer containing 20 to 70 mol %, preferably 35 to 60 mol %, of free isocyanate groups with 10–100%, preferably 15–50%, of the equivalent amount of a di- or polyamine. Polyurethane prepolymers containing isocyanate groups, such as form the basis of the capsule materials to be employed in accordance with the invention are in themselves known. They are obtained by reacting diols and polyols having 3 to 6, preferably 3 to 4, OH groups and diisocyanates or polyisocyanates, preferably di-, tri- or tetra-isocyanates, but especially diisocyanates, the molar ratios between the structural units containing OH groups and the structural units containing isocyanate groups being so chosen that the isocyanate groups are present in excess.

In the polyurethane prepolymers on which the capsule materials to be employed in accordance with the invention are based the ratio of diol components to polyol components is between 1 to 0 and 1 to 3, preferably between 1 to 0 and 1 to 2. In the event that polyisocyanates are to be incorporated into the polyurethane prepolymers, a molar ratio of diisocyanate to polyisocyanate of 1:0.1 to 1:1 is selected.

The hydrocarbon radicals of the diol and polyol structural units are aliphatic or cycloaliphatic and contain 2 to 10, preferably 2 to 6, carbon atoms. The diol structural units can also be derived wholly or partly from dihydroxypolyethers (polyalkylene glycols). Polyalkylene glycols of this type are polymers of alkylene oxides, as e.g. of ethylene oxide or propylene oxide, or they are copolymers of different alkylene oxides, as e.g. of ethylene oxide and propylene oxide. They have 2–4 C atoms in the individual alkylene radicals and contain 9 to 70, preferably 10 to 25, alkylene oxide units, which corresponds, for example for polyethylene glycol, to molecular weights of approx. 400 to approx. 3,000, preferably approx. 440 to 1,100.

The hydrocarbon radicals of the diisocyanates and polyisocyanates can also be aliphatic or cycloaliphatic, but they can also be aromatic. Aliphatic hydrocarbon radicals have 1 to 8, preferably 1 to 6, carbon atoms, while aromatic or cycloaliphatic or araliphatic radicals have 6 to 10 carbon atoms, as a rule.

The polyurethane prepolymers on which the capsule materials to be employed in accordance with the invention are based contain, per equivalent of diol or polyol, 1.1 to 2, preferably 1.2 to 1.8, equivalents of diisocyanates and polyisocyanates. The equivalent weight is quoted in this case as the molecular weight divided by the number of functional groups present in the molecule, that is to say in the case of diols and polyols the molecular weight divided by the number of OH groups in the molecule, and, in the case of the diisocyanates and polyisocyanates, the molecular weight divided by the number of isocyanate groups in the molecule.

Capsule materials according to the invention which additionally contain 5 to 20% by weight of known external elasticising agents which are used in the field of polymer technology, possess an additionally increased elasticity and capacity for resistance. Examples of elasticising agents which can be present in the capsule materials according to the invention are decribed in "Römmps Chemie Lexikon" ("Römmp's Dictionary of Chemistry"), 7th Edition (1977), Vol. 6, pages 3893 et seq. Examples are dialkyl and diisoalkyl phthalates having an alkanol radical with a fairly long chain, acyclic, aliphatic dicarboxylic acid esters having alkanol radicals with a fairly long chain, polymer plasticisers based on polyesters, phosphoric acid esters of fatty acid esters, and epoxide plasticisers.

The salts which have been encapsulated in accordance with the invention can be derived from organic and inorganic acids. Examples of organic acids are the aromatic, or preferably higher aliphatic, carboxylic acids which form sparingly soluble salts, in particular carboxylic acids having more than 5 carbon atoms, such as, for example, lauric acid, palmitic acid, stearic acid and oleic acid and also organic sulphonic acids. Preferably, however, the salts are derived from inorganic acids, such as, for example, carbonic acid, phosphoric acid, hydrochloric acid, sulphuric acid, hydrofluoric acid or complex acids, such as $H_2SiF_6$, $H_3AlF_6$ and $H_2SiO_3$. The cations present in the sparingly soluble salts which have been encapsulated in accordance with the invention are the cations of the alkaline earth metals, magnesium, calcium, strontium and barium, and, in the case of the complex inorganic acids, also the cations of the alkali metals, in particular lithium, sodium and postassium cations.

Special mention should be made of alkaline earth metal sulphates and carbonates, lithium carbonate and calcium stearate; particularly preferred salts are calcium sulphate, $CaSiF_6$, $Na_3AlF_6$, $K_3AlF_6$, $Li_3AlF_6$, calcium silicate and calcium fluoride.

The encapsulated salts, according to the invention, of sparing solubility in water form particles having a high elasticity and high abrasion resistance. The size distribution of the particles is between 5 mm and 0.005 mm, preferably within the range from 0.5 mm to 0.01 mm.

The preparation of the encapsulated salts, according to the invention, of sparing solubility in water is effected by emulsifying in water, in the presence of a protective colloid, a mixture consisting of 83 to 28% by weight, preferably 75 to 56% by weight, of the salts to be encapsulated and 17 to 72% by weight, preferably 25 to 44% by weight, of a polyurethane prepolymer containing free isocyanate groups, which mixture has, if necessary, been rendered free-flowing by adding a sufficient amount of an inert, water-immiscible organic solvent, and reacting the mixture with 10 to 100% of the equivalent amount of diamines or polyamines at temperatures of 0° to 80° C., preferably 10° to 60° C., with vigorous mixing.

Advantageously, the mixture which has been rendered free-flowing and is composed of the salt of sparing solubility in water and the polyurethane prepolymer contains the salt in a very fine state of division. The fine state of division of the salt can be achieved in a manner known per se, for example by grinding or, advantageously, by stirring at a very high speed using, for example, an Ultra-Turrax device.

The polyurethane employed for the encapsulation contains 20 to 70 mole %, preferably 35 to 70 mole %, of free isocyanate groups and in other respects has the composition indicated earlier in the text.

A polyurethane of the invention contains X mol% of free isocyanate groups if X % of the isocyanate groups which are initially present in the di- or polyisocyanate used as starting material are still free after the conversion with the diol or polyol and $(100-X)$ % have been converted to urethane groups.

Inert, water-immiscible organic solvents which can be used for rendering free-flowing the mixture composed of the salt to be encapsulated plus the polyurethane, are, in particular, aromatic hydrocarbons, such as, for example, benzene, toluene, xylene, technical xylene mixtures and water-insoluble esters of lower alcohols having 1 to 4 carbon atoms, glycol, diglycol or triglycol and also half-ethers thereof with lower aliphatic carboxylic acids having 1 to 4 carbon atoms, or esters of aromatic carboxylic acids, such as benzoic acid or phthalic acid, particularly those with alcohols of medium chain length. Esters of acetic acid with alcohols having 1 to 4 carbon atoms, glycol, glycol monomethyl or monoethyl ether, diglycol and diglycol monomethyl or monoethyl ether and esters of phthalic acid with alcohols having 6 to 12 C atoms are preferred. Inert organic solvents which are particularly preferred are xylene and ethylglycol acetate (1-ethoxy-2-acetoxyethane) and the phthalic acid esters mentioned. It is, of course, also possible to employ, and this offers advantages in some cases, mixtures of the above-mentioned inert, water-immiscible solvents. The amount of the solvent is such that the mixture consisting of the salt to the encapsulated and the polyurethane is free-flowing, that is to say has at least a consistency similar to that of honey.

Suitable protective colloids which assist the emulsification of the organic phase in the aqueous phase are either synthetic or natural products. Compounds of this type are known in large numbers. From the group of synthetic protective colloids, special mention should be made of polyvinyl alcohol and polyvinyl acetate and also nonionic, anionic or cationic, surface-active substances. From the series of natural protective colloids, mention should be made of biopolymers, such as, for example, gum arabic, cellulose derivatives, for example carboxymethylcellulose and hydroxyethylcellulose, and also alginic acids and alginic acid derivatives.

The protective colloids based on synthetic polymers or biopolymers are added to the water in concentrations of 0.1 to 10% by weight, preferably 1 to 4% by weight. Nonionic, anionic or cationic surface-active agents can be employed in concentrations of 0.1 to 5% by weight, preferably 1 to 1.5% by weight.

The addition of the polyurethane/salt mixture to the aqueous phase is effected with vigorous mixing using means known for this purpose. In particular, the mixing is carried out using stirrer or high-speed stirrer units. The stirring speed in these cases is between 100 and 5,000 revolutions per minute, preferably between 200 and 2,000 revolutions per minute. As soon as the polyurethane/salt mixture is emulsified, the diamine or polyamine used for lengthening the chain or for crosslinking is added to the aqueous phase. In this connection it is not necessary to employ the amount of amino groups equivalent to the free isocyanate groups, since the water, which is present in a large excess, helps to cause self-crosslinking of the polyurethane containing isocyanate groups which is employed. It is preferable, therefore, to react the polyurethane containing free isocyanate groups with 10 to 100%, preferably 15 to 50%, of the equivalent amounts of the diamine or polyamine. At an average equivalent weight of 400 to 3,000 for the polyurethane containing free isocyanate groups and an equivalent weight of approx. 30 to 45 for the diamine or polyamine, this means that the diamine or polyamine is employed in an amount of 0.1 to 11% by weight, preferably 0.5 to 5% by weight, and especially 0.5 to 1.5% by weight, of the amount of polyurethane. Diamines or polyamines which are suitable for the reaction with the polyurethane containing free isocyanate groups contain —NH$_2$ and —NH— groups which are attached to one another via lower aliphatic, divalent hydrocarbon radicals. Examples of such known diamines and polyamines are ethylenediamine, diethylenetriamine, diaminopropane, dipropylenetriamine, diaminobutane, tetraethylenepentamine, triethylenetetramine or linear or branched polyethyleneimine.

A particularly preferred embodiment of the process for preparing the encapsulated salts, according to the invention, of sparing solubility in water consists in adding an electrolyte to the aqueous phase into which the polyurethane/salt mixture is run. Electrolytes suitable for this purpose are derived from monovalent to trivalent metal cations, especially those of the first three groups of the periodic system and from monovalent to trivalent acids, preferably inorganic acids, and suitable cation-anion combinations are, of course, only those which do not precipitate salts of sparing solubility in water. Alkali metal and alkaline earth metal cations and also aluminium and ammonium are particularly suitable.

Examples of particularly preferred electrolytes are NaCl, KCl, NH$_4$Cl, MgCl$_2$, CaCl$_2$ and KAl(SO$_4$)$_2$. The concentration of the electrolytes in the aqueous phase is between 0.25% and the saturation concentration of the salts concerned, 50% at the most. It is preferable to employ 5 to 30% by weight of the electrolyte.

Particularly high yields of the encapsulated salts according to the invention are obtained by the preferred process. In addition, the polyurethane/polyurea capsules thus obtained display a particularly advantageous combination of mechanical strength and selective permeability for external reagents.

Thus, in spite of the high mechanical strength of the capsules, it is possible, surprisingly, to liberate the corresponding acids in a controlled manner and in a definite concentration from the encapsulated salts according to the invention by the action of stronger acids. Examples of acids of this type which can be liberated are $H_2F_2$, $H_2SiF_6$, $H_3AlF_6$, $H_2SO_4$ and $H_2SiO_3$.

Salts, encapsulated in accordance with the invention, of sparingly soluble inorganic acids are, accordingly, excellently suitable for liberating the corresponding acids or their conjugate bases in an innocuous and controlled manner and at a predeterminable rate and in a predeterminable concentration at a desired point which is, under certain circumstances, inaccessible. Thus, for example, the corrosive solutions of hydrofluoric acid in combination with potassium, sodium or ammonium fluorides, used in industry for frosting glass, can be replaced very easily by granules prepared in accordance with Example 1. A particular advantage in this case is the simple handling of the granules, which are dust-free and, as a result of the sparing solubility of the encapsulated fluoride donor, completely harmless, and which can be flushed by means of a liquid or a stream of gas to an otherwise inaccessible spot, even in a complicated closed glass apparatus, without first reacting with the glass. All the glass components which are not to be frosted thus remain unaffected. As soon as the encapsulated fluoride donor is at the desired point, HF can be liberated in a controlled manner from the microcapsules by reducing the pH, for example by means of HCl, and this initiates the frosting process.

Correspondingly, it is possible to interrupt the frosting process at any time by neutralising the reaction medium, without thereby affecting the activity of the granules adversely. Subsequently, these granules can easily be flushed out of the reaction space again. However, the frosting process can also be restarted at any time by adding HCl again, as long as undissolved fluoride donor is still present in the microcapsules.

In the same way the salts encapsulated in accordance with the invention should enable long-term dosage of the acids encapsulated in the form of their sparingly soluble salts to be made in an ideal manner.

Thus it is possible, for example, to secure the sterilising action of dilute hydrofluoric acid in certain equipment for the production of foodstuffs, or the good binding capacity of HF for calcium, by liberating hydrofluoric acid in a controlled manner, suited to the requirements, and the micro-encapsulation facilitates handling immensely compared with the non-encapsulated pulverulent salts.

Factors which should be singled out in this connection are the harmlessness of the granules arising from the sparing solubility of the encapsulated material, the simple, dust-free handling of the free-flowing product and the resistance of the microcapsules to pressure, as a result of which caking of the microspheres or uncontrolled liberation of the encapsulated salts caused by damage to the wall material is prevented not only during production but also during use.

Sparingly soluble fluorides of fluoro complexes encapsulated according to the invention, such as cryolite, can also be used with particular advantage for the liberation of fluoride anions in deep bores and are, therefore, of great importance in the secondary and tertiary recovery of oil and natural gas.

EXAMPLE 1

43 g of a prepolymer formed from 1.6 moles of 2,4-(2,6)-toluylene diisocyanate and 1 mole of polypropylene glycol (MW 1,000) are converted by homogenisation into a stable dispersion, together with 120 g of $Na_3AlF_6$, 10 g of diisononyl phthalate and 2 g of ethylene glycol acetate.

This dispersion is run into a solution of 275 ml of 25% strength NaCl solution and 25 ml of 1% strength hydroxyethylcellulose in the course of 15 minutes and at a stirrer speed of 200 r.p.m. 4 ml of ethylenediamine are then added, and the mixture is stirred for 5 hours at room temperature.

Yield: 164 g of a uniform, encapsulated product in bead or sphere form. Size distribution: 0.5–2 mm.

EXAMPLE 2

43 g of a prepolymer formed from 1.2 moles of 2,4-toluylene diisocyanate and 1 mole of polyethylene glycol MW 1,000 are converted by homogenisation into a stable dispersion, together with 120 g of $Na_3AlF_6$, 10 g of diisooctylphthalate and 2 g of ethylglycol acetate. This stable dispersion is stirred into a 1% strength aqueous polyvinyl alcohol solution at a stirrer speed of 200 r.p.m. 4 ml of ethylenediamine are then added, and the mixture is stirred for 5 hours at room temperature to complete the reaction.

Yield: 128 g of markedly non-uniform encapsulated particles having a deformed, non-spherical structure.

EXAMPLE 3

400 g of a prepolymer formed from the reaction product of 1.4 moles of 2,4-(2,6)-toluylene diisocyanate with 1 mole of polypropyleneglycol MW 1,000, present in the form of an approx. 50% strength solution in xylene, and 600 g of $CaF_2$, 50 g of diisononyl phthalate and 10 g of ethylglycol acetate are converted into a stable, finely divided dispersion by means of a homogeniser, and the dispersion is run into a solution of 1,640 ml of 33.3% strength NaCl solution and 125 ml of 1% strength tylose solution in the course of 10 minutes. 20 ml of ethylenediamine are then added, and the mixture is stirred for 3 hours at 20°. The resulting capsules are separated off, washed and dried at 70° C.

Yield: 685 g of spherical-shaped material having a high mechanical strength and a particle size distribution of 0.15–0.6 mm.

EXAMPLE 4

43 g of a prepolymer formed from 1.5 moles of 2,4-(2,6)-toluylene diisocyanate and 1.4 moles of polyglycol MW 1,000, employed in the form of an approx. 50% strength solution in xylene, are stirred with 120 g of $Na_3AlF_6$, 10 g of silicone oil AL and 12 g of R Solvesso 200 (a petroleum fraction of boiling range 220° to 280° C.), and the mixture is then stirred into an electrolyte-free aqueous solution of 2% of ®vinarol DT and 2% of moviol ® 18–88 (protective colloids based on polyvinyl alcohol) in the course of 15 minutes and at a stirrer speed of 500 r.p.m. After 5 minutes, 4 ml of a 20% strength ethylenediamine solution are added, and the mixture is stirred for a further 40 minutes at 500 r.p.m. The resulting beads have a good structure, but cannot be isolated since, even after a prolonged period of stirring to complete the reaction (4 hours at 30° C.), they are still deformable.

The 10 g of diisononyl phthalate employed in Example 1 can also be replaced, for example, by 7 g of dimethylphthalate or 5 g of di-3,5,5-trimethylhexylphthalate or 7.4 g of di-isononyladipate or 9.4 g of di-tridecylphthalate; the 2 g of ethylene glycol acetate can be replaced, for example, by 1.8 g of butyleneglycolacetate or 2.2 g of methylglycolacetate; the 25 ml of 1% strength solution of hydroxyethylcellulose can be replaced, for example, by 35 mm of a 1% strength solution of hydroxypropylcellulose.

The examples in the table below (Table I) can also be carried out analogously to illustrative embodiments 1 and 3.

TABLE I

| Example No. | Isocyanate (mol) | Polyol (mol) | Free Isocyanate groups (Mol %) | Amine (Weight %, relative to prepolymer) | Electrolyte (Concentration in aqueous phase Weight %) | Encapsulated Salt (Weight Ratio Salt:Casing) |
|---|---|---|---|---|---|---|
| 1 | Toluylene-diisocyanate (1.6) | Polypropyleneglycol MW 1,000 (1.0) | 58.6 | 9.3 | NaCl (25) | $Na_3AlF_6$ (1:0.4) |
| 3 | Toluylene-diisocyanate (1.4) | Polypropyleneglycol MW 1,000 (1.0) | 58.6 | 5.0 | NaCl (33.3) | $CaF_2$ (1:0.7) |
| 4 | 4,4'-Diphenyl-methane-diisocyanate (1.7) | Polyethyleneglycol MW 2,000 (1.0) | 70 | 10.0 | NaCl (10) | $CaF_2$ (1:0.6) |
| 5 | 4,4'-Diphenyl-methane-diisocyanate (1.2) | Polyethyleneglycol MW 800 (1.0) | 35 | 4.0 | NaCl (23) | $K_3AlF_6$ (1:1) |
| 6 | Hexamethylenediisocyanate (1.5) | Polypropyleneglycol MW 1,000 (1.2) | 70 | 7.5 | KCl (15) | $Na_3AlF_6$ (1:0.9) |
| 7 | m-Xylylenediisocyanate (1.2) | Polyethyleneglycol MW 1,000 (1.0) | 50 | 7.0 | $KAl(SO_4)_2$ (2) | $CaSiF_6$ (1:0.4) |
| 8 | m-Xylylenediisocyanate | Polyethyleneglycol (1.4) | 60 | 4.0 | NaCl (5) | $CaSiF_6$ |
| 9 | Dianisidine-diisocyanate (1.4) | Polyethyleneglycol MW 1,000 (1.0) | 38 | 4.5 | $MgCl_2$ (7) | $CaSiF_6$ (1:0.6) |
| 10 | Dianisidine-diisocyanate (1.6) | Polyethyleneglycol MW 2,000 (1.1) | 40 | 1.5 | KCl (2) | $Na_3AlF_6$ (1:0.6) |
| 11 | Toluylene-diisocyanate (1.4) | Polyethyleneglycol MW 1,000 (1.0) | 60 | 0.8 | $CaCl_2$ (20) | $Li_2CO_3$ (1:2.5) |
| 12 | Toluylene-diisocyanate (1.5) | Polyethyleneglycol MW 2,000 (1.1) | 45 | 1.0 | $MgCl_2$ (14) | Calcium stearate (1:1.8) |
| 13 | Dianisidine-diisocyanate (1.7) | Polyethyleneglycol MW 800 (1.1) | 70 | 1.4 | $NH_4Cl$ (23) | $Na_3AlF_6$ (1:1.5) |
| 14 | Dianisidine-diisocyanate (1.6) | Polyethyleneglycol MW 1,000 (1.1) | 57 | 0.75 | $CaCl_2$ (15) | Calcium stearate (1:0.9) |
| 15 | Hexamethylenediisocyanate (1.4) | Polyethyleneglycol MW 1,500 (1,25) | 30 | 1.5 | $KAl(SO_4)_2$ | $Li_3AlF_6$ (1:0.35) |
| 16 | Toluylene-diisocyanate (1.3) | Polypropyleneglycol MW 2,000 (1.05) | 44 | 4.8 | $MgCl_2$ (28) | $Na_3AlF_6$ (1:2.0) |
| 17 | Hexamethylenediisocyanate (1.6) | Polyethyleneglycol MW 1,000 (1.0) | 54 | 0.1 | $CaCl_2$ (15) | $CaF_2$ (1:0.75) |
| 18 | Dianisidine-diisocyanate (1.75) | Polyethyleneglycol MW 2,000 (1.01) | 47 | 10.0 | $MgCl_2$ (14) | Calcium stearate (1:0.2) |
| 19 | 4,4'-Dinaphthylmethane- | Polyethyleneglycol | 36 | 4.9 | NaCl (15) | $Li_2CO_3$ (1:2.2) |

TABLE I-continued

| Example No. | Isocyanate (mol) | Polyol (mol) | Free Isocyanate groups (Mol %) | Amine (Weight %, relative to prepolymer) | Electrolyte (Concentration in aqueous phase Weight %) | Encapsulated Salt (Weight Ratio Salt:Casing) |
|---|---|---|---|---|---|---|
|  | diisocyanate (1.4) | MW 1,000 (1.0) |  |  |  |  |
| 20 | Toluylene-diisocyanate (1.75) | Polyethyleneglycol MW 2,000 (1.2) | 72 | 4.7 | NaCl (30) | Na$_3$AlF$_6$ (1:2.0) |
| 21 | Dianisidine-diisocyanate (1.5) | Polyethyleneglycol MW 1,500 (1.15) | 45 | 0.8 | CaCl$_2$ (17) | Calcium stearate (1:1.4) |
| 22 | Dianisidine-diisocyanate (1.4) | Polyethyleneglycol MW 1,000 (1.2) | 36 | 1.1 | MgCl$_2$ (24) | CaF$_2$ (1:2.4) |
| 23 | 4,4',4''-Triphenylmethane-triisocyanate (1.7) | Polyethyleneglycol MW 1,000 (1.0) | 70 | 0.8 | KAl(SO$_4$)$_2$ (15) | Na$_3$AlF$_6$ (1:0.6) |
| 24 | Butylene-1,2-diisocyanate (1.4) | Polyethyleneglycol MW 2,000 (1.08) | 44 | 1.4 | NaCl (25) | CaF$_2$ (1:0.7) |
| 25 | Naphthaline-1,4-diisocyanate (1.35) | Polyethyleneglycol MW 800 (1.15) | 24 | 2.3 | MgCl$_2$ (19) | Li$_2$CO$_3$ (1:0.8) |
| 26 | Cyclohexylenediisocyanate (1.4) | Polypropyleneglycol MW 1,000 (1.15) | 38 | 5 | CaCl$_2$ (5) | Li$_3$AlF$_6$ (1:0.2) |
| 27 | Xylylene-1,4-diisocyanate (1.4) | Polyethyleneglycol MW 2,000 (1.15) | 49 | 2 | KAl(SO$_4$)$_2$ (8) | CaSiF$_6$ (1:0.2) |
| 28 | 4,4'-Diphenylpropane-diisocyanate (1.6) | Polyethyleneglycol MW 1,500 (1.22) | 59 | 6.2 | NaCl (22) | Na$_3$AlF$_6$ (1:1.5) |

What is claimed is:

1. In the process for the production of microcapsules of a solid substance being insoluble in water whereby a mixture of the substance to be microencapsulated and a polyurethane prepolymer containing free isocyanate groups is emulsified in water in the presence of a protective colloid and then reacting the polyurethane prepolymer of the mixture with a diamine or a polyamine with vigorous mixing, whereby from the polyurethane prepolymer and the diamine or polyamine a high molecular weight polyurethane is formed which encapsulates the substance to be encapsulated and the microcapsules formed are separated off, the improvement comprises that the substance to be encapsulated is a salt of sparing solubility in water and the mixture contains the salt of sparing solubility in water and the polyurethane prepolymer in a weight relation of from 83:17 to 28:72 and that the polyurethane prepolymer contains 20 to 70 mole % of free isocyanate groups and that the polyurethane prepolymer is reacted with 10 to 100% of the equivalent amount of a diamine or a polyamine at temperatures of 0° to 80° C. and that the aqueous phase contains an electrolyte having a monovalent to trivalent cation selected from the first three groups of the periodic table, and from a monovalent to trivalent acid, in a concentration of 0.25% up to the saturation concentration, but not more than 50%.

2. The process according to claim 1 wherein the polyurethane prepolymer contains 35 to 60 mole % of free isocyanate groups.

3. The process according to claim 1 wherein the aqueous phase contains the electrolyte in a concentration of 5 to 30% by weight.

4. The process according to claim 1 wherein the polyurethane prepolymer is reacted with the diamine or polyamine at 10° to 60° C.

5. The process according to claim 1, wherein the electrolyte contains an alkali metal, alkaline earth metal, ammonium or aluminum cation.

6. The process according to claim 1, wherein the electrolyte is NaCl, KCl, NH$_4$Cl, MgCl$_2$, CaCl$_2$ or KAl(SO$_4$)$_2$.

7. The process according to claim 1 wherein the sparingly soluble salt to be microencapsulated is Li$_3$AlF$_6$, Na$_3$AlF$_6$, K$_3$AlF$_6$, CaSiF$_6$ or CaF$_2$.

8. The process according to claim 1 wherein the sparingly soluble salt to be microencapsulated is Li$_2$CO$_3$, calcium stearate or calium silicate.

* * * * *